(12) United States Patent
Masters et al.

(10) Patent No.: US 7,913,390 B2
(45) Date of Patent: Mar. 29, 2011

(54) TRANSPORT TOOL

(75) Inventors: Matthew J. Masters, Puyallup, WA (US); Jeffrey D. Schwindt, Bonney Lake, WA (US); Larry L. Menghini, Auburn, WA (US); Jeffrey R. Twyford, Edgewood, WA (US)

(73) Assignee: The Boeing Company, Chicago, IL (US)

( * ) Notice: Subject to any disclaimer, the term of this patent is extended or adjusted under 35 U.S.C. 154(b) by 963 days.

(21) Appl. No.: 11/355,601

(22) Filed: Feb. 16, 2006

(65) Prior Publication Data

US 2007/0189884 A1 Aug. 16, 2007

(51) Int. Cl.
*B21D 53/88* (2006.01)
(52) U.S. Cl. ......... 29/897.2; 414/154; 414/431; 29/599; 29/799; 29/824; 29/281.1
(58) Field of Classification Search ................... 414/154, 414/431; 29/559, 799, 824, 281.1
See application file for complete search history.

(56) References Cited

U.S. PATENT DOCUMENTS

| | | | | |
|---|---|---|---|---|
| 1,396,980 | A * | 11/1921 | Thornber | 414/537 |
| 2,815,566 | A | 12/1957 | Hille | |
| 3,937,157 | A * | 2/1976 | Spanel et al. | 112/80.07 |
| 4,086,378 | A * | 4/1978 | Kam et al. | 428/34.5 |
| 4,157,613 | A * | 6/1979 | Morrow | 29/732 |
| 4,214,431 | A * | 7/1980 | Bruce et al. | 57/22 |
| 4,272,977 | A * | 6/1981 | Gombas | 72/121 |
| 4,463,044 | A * | 7/1984 | McKinney | 428/107 |
| 5,123,602 | A * | 6/1992 | Skalleberg et al. | 242/393 |
| 5,193,242 | A * | 3/1993 | Irwin | 15/104.33 |
| 5,266,137 | A * | 11/1993 | Hollingsworth | 156/156 |
| 5,770,243 | A * | 6/1998 | Butterworth | 425/389 |
| 6,223,413 | B1 * | 5/2001 | Crocker et al. | 29/524.1 |
| 6,423,151 | B1 * | 7/2002 | Gonzalez et al. | 134/10 |
| 6,692,681 | B1 * | 2/2004 | Lunde | 264/510 |
| 6,867,393 | B1 * | 3/2005 | Lewis | 219/401 |
| 7,503,368 | B2 * | 3/2009 | Chapman et al. | 156/425 |
| 2004/0056400 | A1 * | 3/2004 | Ghuman et al. | 269/71 |
| 2004/0056498 | A1 * | 3/2004 | Ghuman et al. | 296/1.01 |
| 2005/0166639 | A1 * | 8/2005 | Skeen et al. | 65/104 |
| 2005/0247396 | A1 * | 11/2005 | Oldani et al. | 156/173 |

FOREIGN PATENT DOCUMENTS

DE 3709832 10/1988

OTHER PUBLICATIONS

International Search Report on corresponding PCT application (PCT/US2007/004063) from International Searching Authority (EPO) dated Jul. 15, 2008.

(Continued)

*Primary Examiner* — Saúl J Rodríguez
*Assistant Examiner* — Glenn Myers
(74) *Attorney, Agent, or Firm* — Yee & Associates, P.C.; Brett L. Halperin

(57) ABSTRACT

A transportation tool for transporting, for example, a single composite aircraft fuselage section, including a first spindle weldment mounted on a first tower, and a second spindle weldment mounted on a second tower and configured to couple the single composite aircraft fuselage section to the towers. A first gimbal assembly configured to allow the first spindle weldment to move independent of the first tower, and a second gimbal assembly configured to allow the second spindle weldment to move independent of the second tower.

21 Claims, 7 Drawing Sheets

OTHER PUBLICATIONS

Written Opinion on corresponding PCT application (PCT/US2007/004063) from International Searching Authority (EPO) dated Jul. 15, 2008.

Wallace, "Airbus considers composite fuselage", Nov. 4, 2006, pp. 1-2 www.seattlepi.com/business/291097_airbus04.html.

"Boeing Receives First 737-900 Fuselage", KOMO News, Seattle, Washington, 1 page, retrieved Mar. 1, 2010 www.komonews.com/news/archive/3992451.html/.

Image of rollover fixture used at Boeing Everett Facility to roll partial metallic fuselage, 1 page, retrieved Mar. 1, 2010 www.ntew.com/images/b777froll.jpg.

"Taiwan P-3s hit the open road", NAVAIR News Release E201001141, Jan. 14, 2010, pp. 1-2.

Klebba, "Large technology object handling, storage, transport and exhibition installation", Australian War Memorial, pp. 1-24, retrieved Mar. 1, 2010 www.awm.gov.au/events/conference/bigstuff/papers/storage/transport.pdf.

* cited by examiner

TRANSPORT TOOL

TECHNICAL FIELD

The present embodiments relate to a tool used for handling multiple-length composite fuselage sections with integrated related tooling and used to assist with trim and non-destructive inspection (NDI) operations of multiple-length composite fuselage sections.

BACKGROUND

Aircraft manufacturing technology has advanced to the state where the creation of a very large one-piece aircraft composite fuselage section creating load requirements of near 50,000 lbs (22,680 kgs) is possible.

These unique airplane fuselage sections have driven a need for proper handling equipment. For example, in test programs for large aircraft composite fuselage sections, a need has arisen for a tool capable of supporting, positioning and transporting large composite fuselage sections of varying lengths, while the sections are integrated with layup tools and internal support tooling. The sections must be supported and positioned while being transported throughout a factory and while being moved in and out of an autoclave. Heretofore, such large transport tools were not necessary since the manufacture of large composite fuselage sections was not done.

SUMMARY

The present disclosure provides a tool capable of supporting, positioning and transporting large composite fuselage sections of varying lengths. Moreover, the tool of the present disclosure may be capable of supporting, positioning and transporting the sections with integrated layup tools and internal support tooling throughout a factory and while being moved in and out of an autoclave.

In an aspect of the disclosure, a transportation tool is provided that includes a first tower, and a second tower. A first side rail and a second side rail secure the first tower to the second tower to support a payload. The first and second side rails define vacuum chamber accumulators.

In another aspect of the disclosure, a transportation tool is provided for transporting a single composite aircraft fuselage section. The tool includes a first spindle weldment mounted on a first tower, and a second spindle weldment mounted on a second tower. The spindle weldments are configured to couple the single composite aircraft fuselage section to the first and second towers. Also included is a first gimbal assembly configured to allow the first spindle weldment to move independent of the first tower, and a second gimbal assembly configured to allow the second spindle weldment to move independent of the second tower. The tool further includes a first side rail and a second side rail for securing the first tower to the second tower. The first and second side rails define vacuum chamber accumulators.

In yet another aspect of the disclosure, a method is provided for manufacture of a one-piece composite aircraft fuselage. The method comprises loading a composite fuselage into a support structure, performing vacuum bagging operations on the composite fuselage, and maintaining vacuum integrity of the bagged composite fuselage for processing in an autoclave using vacuum accumulators integrated into the support structure.

Additional objects and features of the disclosure will be set forth in part in the detailed description which follows. It is to be understood that both the foregoing general description and the following detailed description are merely example embodiments of the disclosure, and are intended to provide an overview or framework for understanding the nature and character of the embodiments of the disclosure as they are claimed.

BRIEF DESCRIPTION OF THE DRAWINGS

The accompanying drawings are included to provide further understanding of the disclosure, illustrate various embodiments, and together with the description serve to explain the principles and operation of the embodiments. In the drawings, the same components have the same reference numerals. The drawings illustrate the present embodiments, but do not to limit the claims. The drawings include the following Figures:

DETAILED DESCRIPTION

Figure 1:
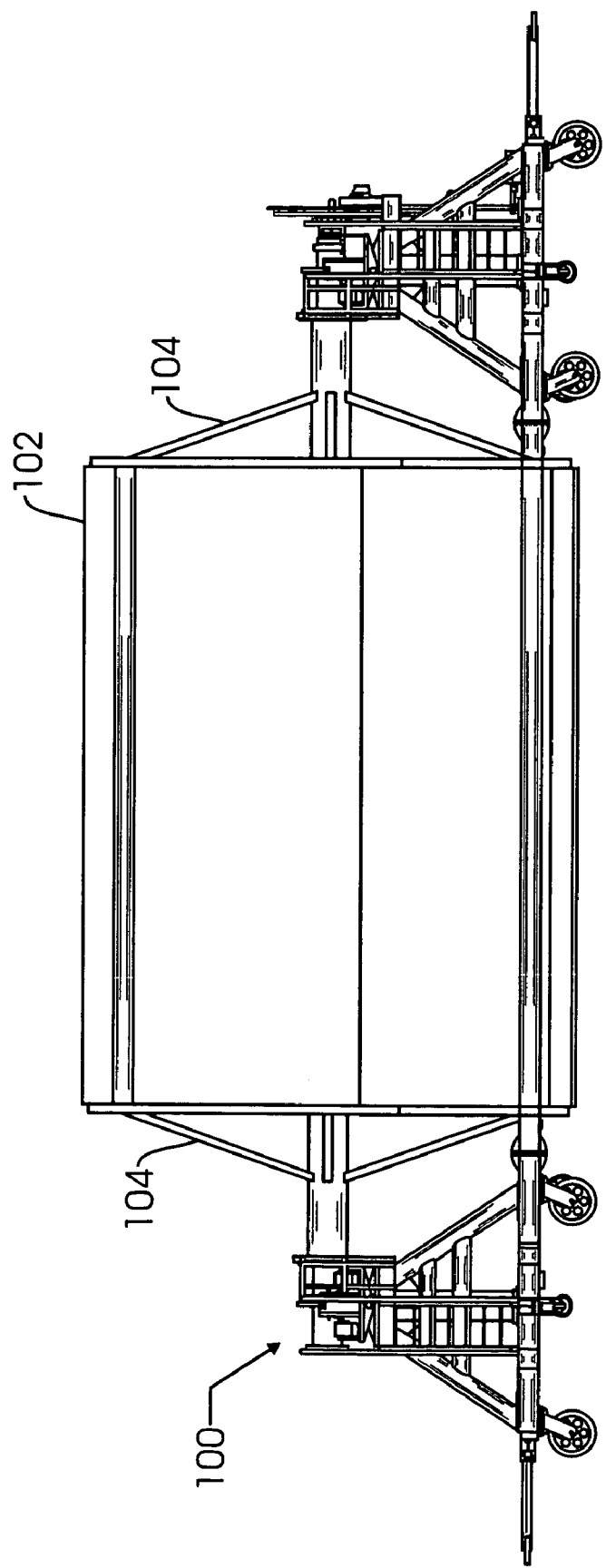
FIG. 1 is a support, position and transport tool for a large payload in accordance with one of the present embodiments.

FIG. 1 is an illustration of a multi-use transport tool 100 or cart created to support, position and transport a payload 102, with a capacity of up to approximately 50,000 lbs (22,680 kgs). In one embodiment, payload 102 includes a composite fuselage section of an aircraft and may further include integrated layup and support tooling. As an example of the capacity of tool 100, payload 102 may be a payload up to about 42 ft (12.8 m) long with a diameter of up to about 20 ft (6.1 m).

Payload 102 may be manufactured using well-known composite manufacturing techniques, which may involve using tape layup processes that require the use of an autoclave to cure the composite material. Accordingly, tool 100 is capable of enduring adverse environments such as those generated by an autoclave, for example, elevated temperatures of about 450° F. (232° C.) and elevated pressures of about 90 psi (621 kPa). Tool 100 may be used to support and transport payload 102 from an area including a tape layup machine to an area housing the autoclave. Tool 100 may be required to support payload 102 in the environment created by the autoclave for the duration of a cure cycle. Tool 100 may then be used to transport payload 102 to non-destructive inspection (NDI) and trim area. Those of ordinary skill in the art will appreciate that the present multi-use transport tool 100 is not limited to applications involving composite payloads.

After tool 100 has been used to support payload 102 throughout the composite layup and curing, process, tool 100 may then be used in conjunction with secondary support tooling (not shown) to transport payload 102 to a location that may be, for example, miles (kilometers) away. As described below, tool 100 includes features to reduce deflection in payload 102 caused by dynamic load effects experienced during the entire transport sequence.

Figure 2:
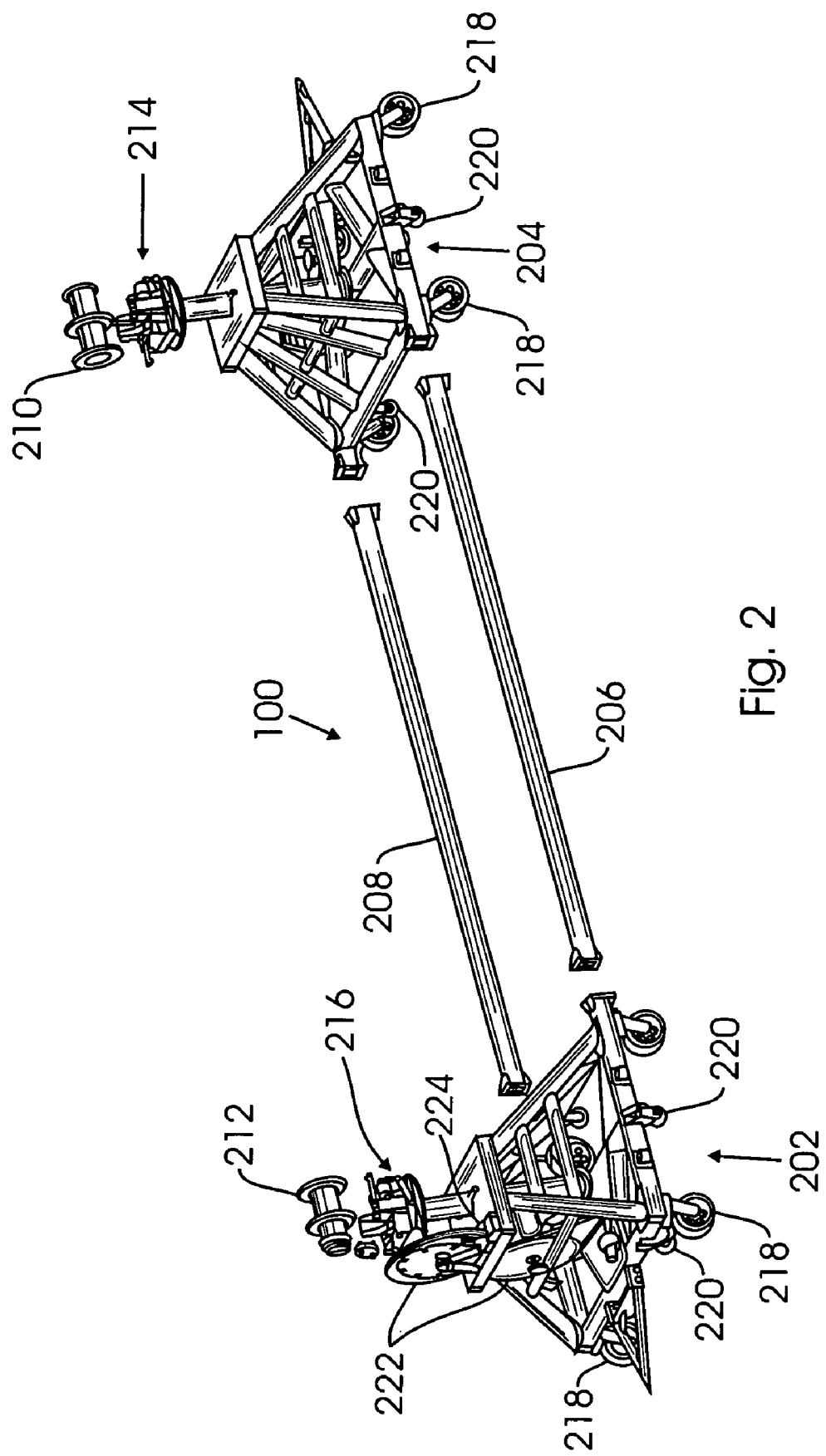
FIG. 2 is an exploded view of the tool of FIG. 1 in accordance with one of the present embodiments.

FIG. 2 is an exploded view of tool 100 in accordance with one of the present embodiments. In the illustrated embodiment, tool 100 includes first tower 202, second tower 204, first side rail 206, second side rail 208, free end spindle weldment 210, geared end spindle weldment 212, free end gimbal assembly 214, and geared end gimbal assembly 216. Eight swivel casters 218, twelve autoclave casters 220, a pneumatic powered drive system 222 and a pneumatic disk brake system 224 with pneumatic controls facilitate the transportation function of tool 100. Those of ordinary skill in the art will appreciate that different numbers of swivel casters 218 and autoclave casters 220 may be provided.

The supported payload 102 indexes to spindle weldments 210, 212 with a receptacle 302 (FIG. 3) that captures a spherical hub (not shown). As shown in FIG. 1, generally, the hub along with mandrel 104 is an integrated part of payload 102 and thus is common among different types of payloads. After indexing payload 102, mandrel 104, supporting payload 102, and tool 100 may then be bolted at spindle weldments 210, 212, for example, along the bolt pattern 304 shown in FIG. 3.

As shown in FIGS. 2, 4A, 4B and 5, spindle weldments 210, 212 each rest on gimbal assemblies 214, 216, respectively. Each gimbal assembly 214, 216 is supported by structural first tower 202 and second tower 204, respectively. Towers 202, 204 can be made of any suitable material, such as steel for example.

Tool 100 may experience various transportation routes. For example, the uncured payload 102 may be transported from a layup area to a cure area. The post cure payload 102 may be transported from the cure area to a trim, test and assembly area. The trimmed payload 102 may be transported from the trim/test/assembly area across roadways (which can include railroad tracks) to various other locations, such as a paint hangar. All of these moves may cause payload 102 to experience dynamic effects created by rough and uneven surfaces. As a result, the relative position of first tower 202 and second tower 204 may see movement, deflection, racking and vibration with respect to each other and/or with respect to the payload 102. Undesirable loads, deflections, racking or vibrations can be transferred into and to have undesirable effects on the production payload 102. For example, wrinkles may develop in the pre-cured payload 102 when moving it from the layup area to the cure area.

In accordance with one of the present embodiments, gimbal assemblies 214, 216 are incorporated into tool 100 to reduce the effects of the undesirable loads. Gimbal assemblies 214, 216 reduce induced deflections of the pre-cured and post-cured payload 102 as well as provide bearings for support and rotation.

Figure 5:
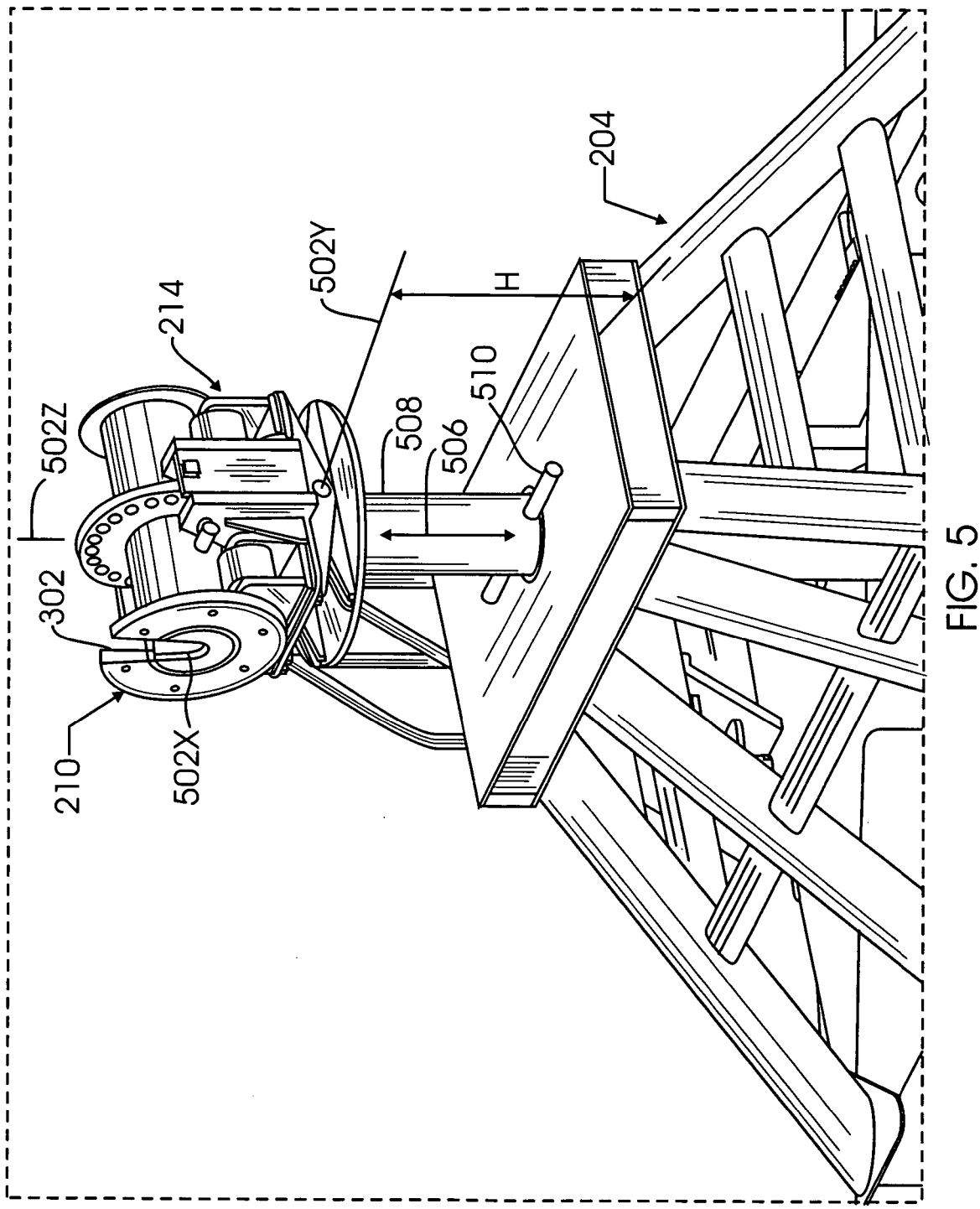
FIG. 5 is a detailed perspective view of a tower of the transport tool of FIG. 1 in accordance with one of the present embodiments.

Gimbal assemblies 214, 216 allow payload 102 to be supported independent of the deflections experienced by tool 100. With reference to FIG. 5, gimbal assemblies 214, 216 allow payload 102 and spindle weldments 210, 212 to rotate about longitudinal axis 502X, lateral horizontal axis 502Y, and vertical axis 502Z using, for example, a set of roller bearings.

As best illustrated in FIG. 5 with regard to gimbal assembly 214, each gimbal assembly 214, 216 may be vertically repositioned as indicated by arrow 506 to an elevated height H. Height H may range from 0 ft (0 m) to about 3 ft. (0.9 m). Before moving gimbal assemblies 214, 216 along arrow 506, payload 102 may be removed. With the payload 102 removed, gimbal assemblies 214, 216 are lifted to expose a portion of column 508. A pin 510 is then positioned through column 508 to bear on platform 511 and hold column 508 at the elevated position H. The ability to raise and lower gimbal assemblies 214, 216 assists for example NDI, bagging and trimming operations.

Figure 3:
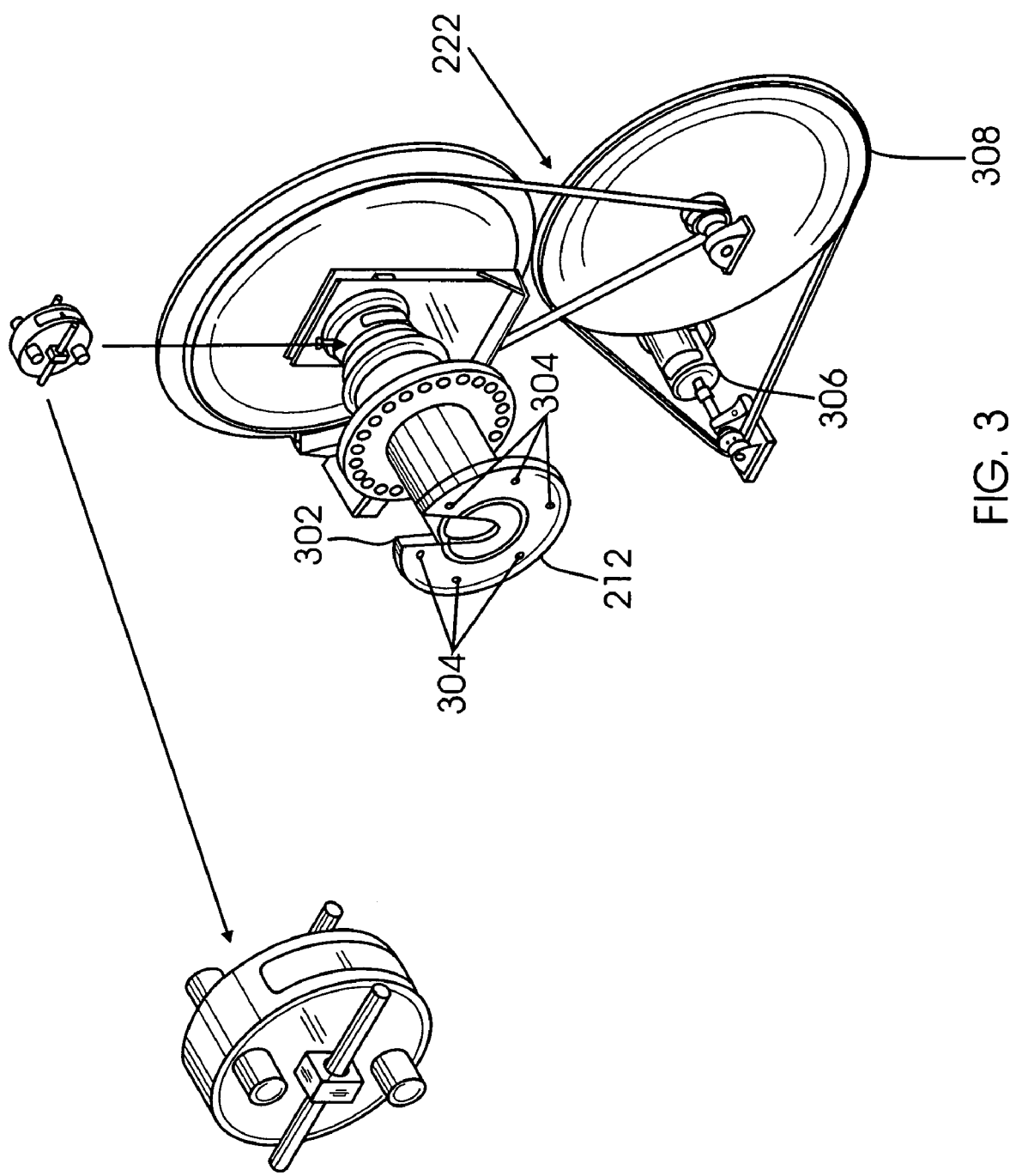
FIG. 3 is an exploded view of a component of the tool of FIG. 1 in accordance with one of the present embodiments.
Figure 4A:
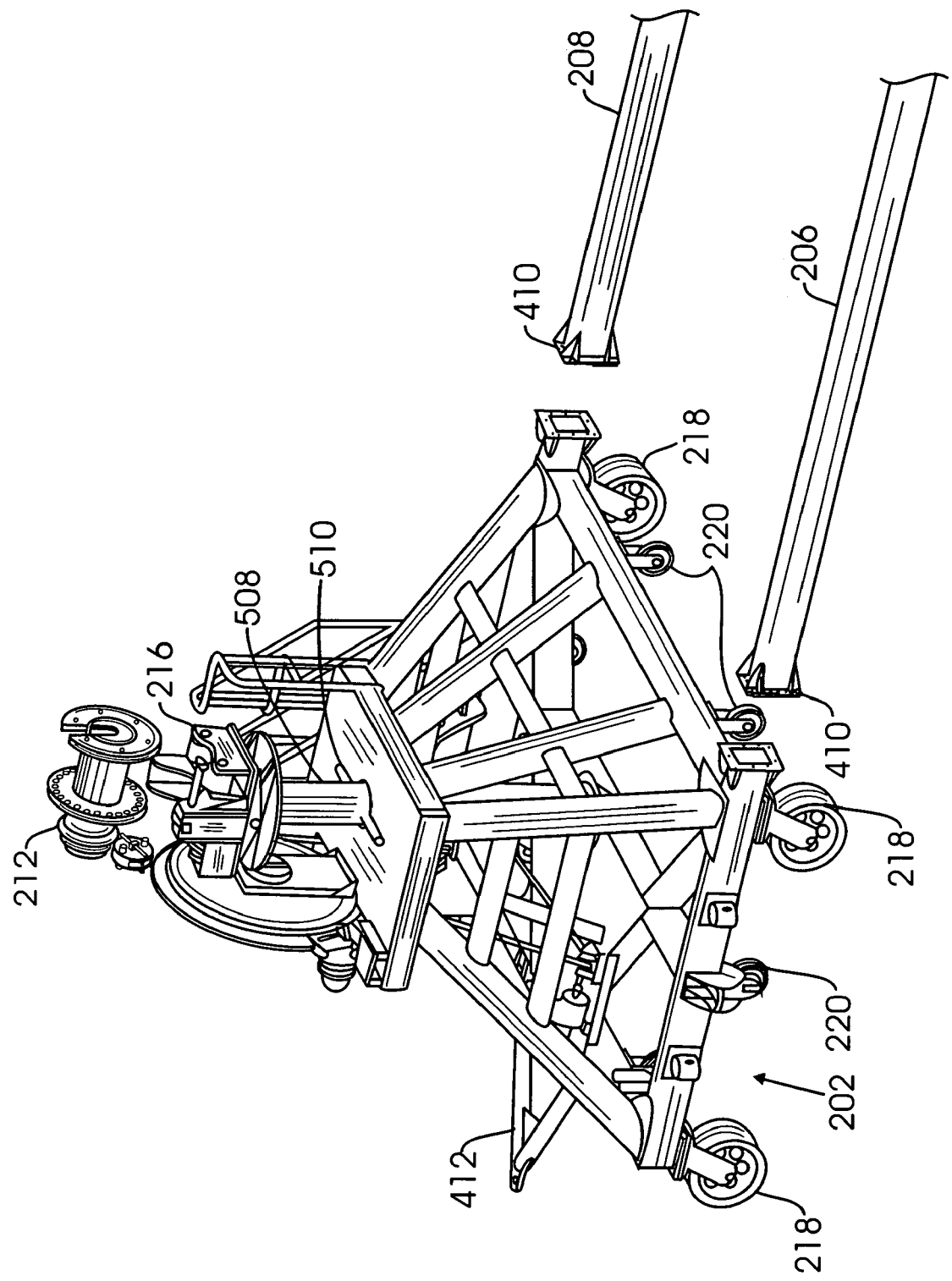
FIGS. 4A and 4B are perspective views of the first and second towers in accordance with one of the present embodiments.
Figure 6:
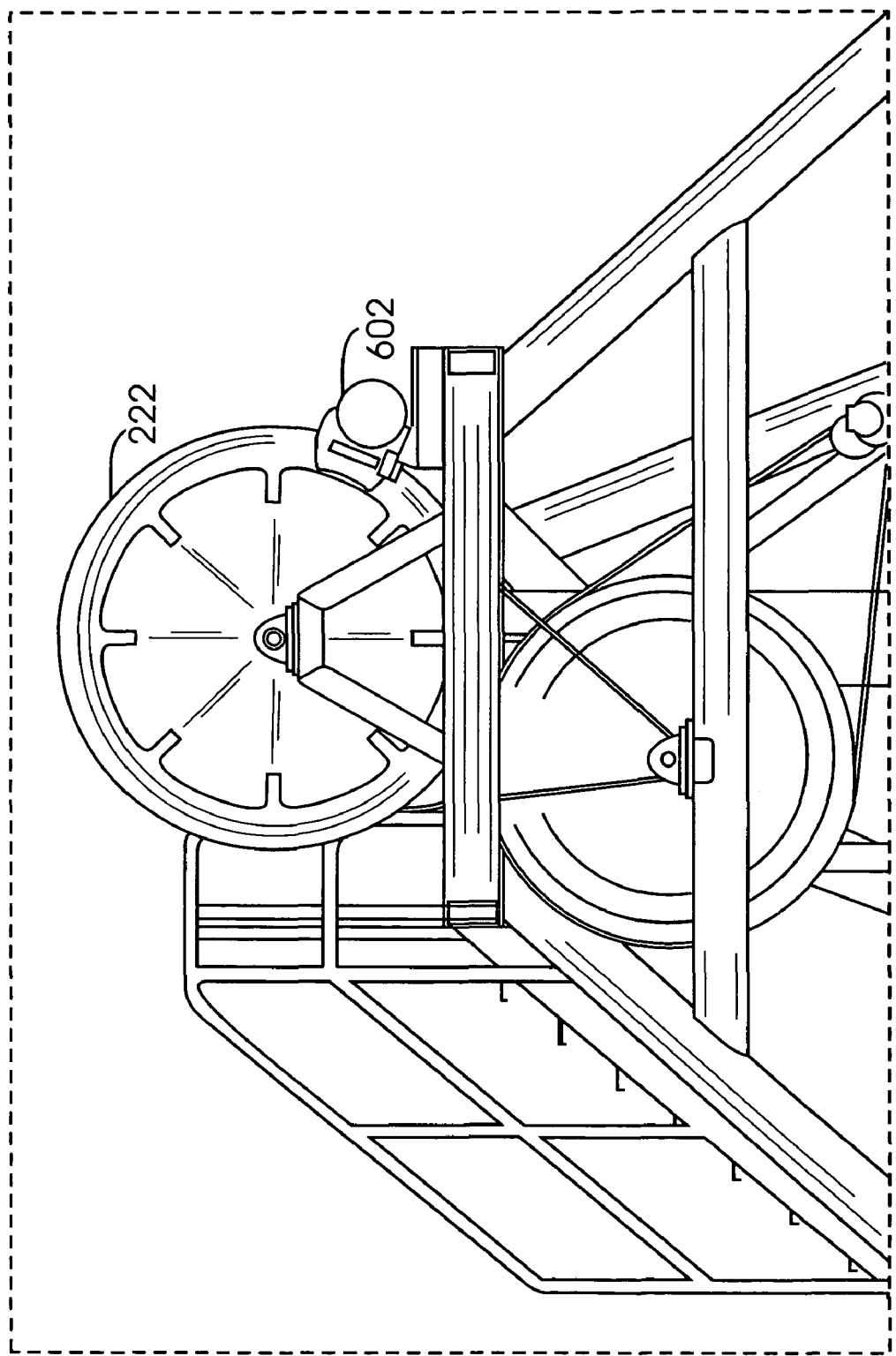
FIG. 6 is an illustration of a removable disk brake in use with a drive system in accordance with one of the present embodiments.

As shown in FIGS. 3, 4A and 6, spindle weldment 212 on first tower 202 at the drive end of tool 100 is coupled to drive system 222 that controls longitudinal rotation of payload 102. In one embodiment, drive system 222 is pneumatically powered. For example, drive system 222 may operate with shop supplied air routed through a control box (not shown). In one embodiment, as shown in FIG. 3, load may be transmitted by an air motor 306 and a series of chain driven gears 308. In one embodiment, through a particular arrangement of gears, motor 306 can generate an output beyond 8,300 ft-lbs (11,200 Nm) of torque.

In one embodiment, drive system 222 may rotate payload 102 both in the clockwise and counterclockwise directions. When motor 306 is powered on, pneumatic disk brake 602 (FIG. 6) may be disengaged. When motor 306 is powered off, pneumatic disk brake 602. may be engaged. Once payload 102 comes to rest, pneumatic disk brake 602 resists undesired rotation of payload 102. In one embodiment, disk brake 602 may resist up to 16,600 ft-lbs (22,510 Nm) of torque, including a safety factor. In one embodiment, air motor 306 and disk brake 602 are removable from toot 100 so that air motor 306 and disk brake 602 are not exposed to the autoclave environment. Once the autoclave operations are complete, motor 306 and brake 602 may be reinstalled.

In one operational example, the power and braking systems may be expected to turn and stop an unbalanced payload 102 at up to 8,333 ft-lbs (11,300 Nm) of torque. In this example, payload 102 is a composite fuselage section. Due to tolerances in layup tool manufacturing and layup variability, a 50,000 lb (22,680 kg) load could vary from the theoretical axis of rotation by up to 2 in (5 cm). Also, different geometries of fuselage sections can add to the generation of imbalanced loads.

It is undesirable for an imbalanced payload 102 to spool freely. Spooling may be controlled by applying back pressure to the air motor. 306. Since the example system is pneumatically powered, it may function such that when the air is on, motor 306 turns and brake 602 is disengaged. In one embodiment, to power air motor 306 an operator must physically hold the control knob to an on position. When the air is off, motor 306 ceases operation and a spring loaded brake 602 is applied. Brake 602 is disengaged with air pressure and engaged by releasing the air pressure in order to activate the spring mechanism.

Figure 4B:
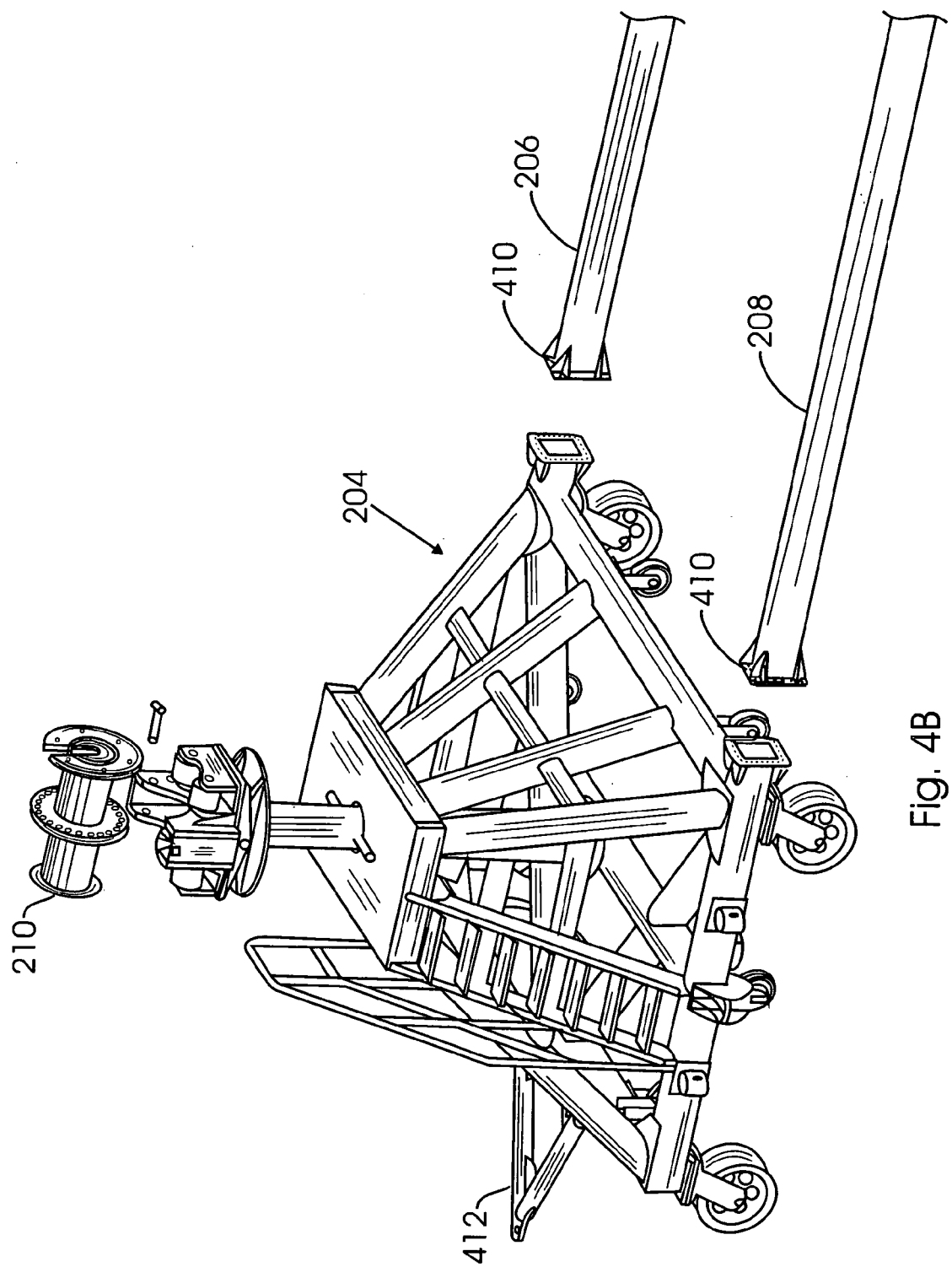

Alternatively, a set of lock pins 400 as shown in FIGS. 4A and 4B, one per tower 202, 204, may be inserted through bearing assemblies on gimbal assemblies 214, 216 to serve as a backup to brake 602 for prevention of rotation during stationary operations. In one embodiment, the lock pin 400 and housing 402 are engineered to resist over 41,600 ft-lbs (56,400 Nm) of torque including a safety factor. Additionally, the lock pins may serve the same function for ground transportation operations. The pins are installed and removed manually.

As shown in FIGS. 4A and 4B, spindle weldments 210, 212 on the first and second towers 204 rest on bearings 404, which allow for rotation of spindle weldments 210, 212 about longitudinal. axis $A_L$. Spindle weldments 210, 212 also allow for translation along longitudinal axis $A_L$, which may be caused by thermal expansion during the payload 102 build/cure/transport cycle.

As shown in FIGS. 2, 4A, and 4B, first tower 202 and second tower 204 are joined together by a first hollow side rail 206, a second hollow side rail 208 and fasteners 410. In certain embodiments, the side rails 206, 208 may not be hollow. However, in embodiments in which the side rails 206, 208 are hollow they may serve as vacuum accumulators to maintain vacuum pressure to a bagged payload 102, such as a bagged pre-cured composite fuselage section. Hollow side rails 206, 208 are equipped with valve fittings 226 (FIG. 4A) to connect vacuum hoses (not shown).

Typically, vacuum accumulators are a separate independent system attached to transport tools. In accordance with the present embodiments, integrated parts of tool 100, namely hollow side rails 206, 208, may be used as vacuum accumulators. This adaptation reduces tooling costs.

The hollow side rails 206, 208 comprise an integrated vacuum system, which may be used to hold vacuum on a bagged payload 102 while the payload 102 is being transported, for example, from a layup area to a curing area. The integrated vacuum system may also be used after cure to transport the payload 102 to the NDI and trim area.

In one embodiment, once air is pumped out of the hollow side rails 206, 208, the hoses are disconnected from the valves 226 leaving hollow side rails 206, 208 charged with less than atmospheric pressure. When needed in the transport process, hoses can be re-connected from hollow side rails 206, 208 to the bagged payload 102. In this embodiment, the bagged payload 102 has previously had air evacuated from it and been sealed. When the bagged payload 102 is connected via the hoses to the hollow side rails 206, 208, the valves 226 are opened so that the vacuum pressure in the hollow side rails 206, 208 is transferred to the bagged payload 102. In this manner, vacuum pressure can be maintained on the bagged payload 102 such that any leaking in the bag system is overcome.

As best shown in FIGS. 4A and 4B, for ground transportation, each tower 202, 204 has four swivel casters 218. In certain embodiments, the swivel casters 218 may be spring loaded. To shuttle the payload 102 in and out of the autoclave, the swivel casters 218 are removed from each tower 202, 204. Towers 202, 204 are equipped with jack support points 406 (FIG. 4B) to raise and lower the towers 202, 204. Using jack supports (not shown), tool 100 may be lowered on to a different set of casters 220, referred to as autoclave casters 220. Each tower 202, 204 may have at least six autoclave casters 220. Each autoclave caster 220 may have a raised ridge 408 circumscribing the caster 220 that coordinates to recessed floor mounted steel tracks (not shown).

Again referring to FIGS. 4A and 4B, each tower 202, 204 may be equipped with a tow bar 412. Tow bar 412 may be used to connect the assembled tool 100 to a towing device (not shown) such as a tug or a fork truck. One tow bar 412 may be used for longitudinal towing and another (not shown) may be attached to the side(s) of either or both towers 202, 204 for lateral positioning.

The scope of the present disclosure should not be limited to the particular embodiments illustrated and described herein, as they are merely examples, but rather, should be fully commensurate with that of the claims appended hereafter and their functional equivalents.

What is claimed is:

1. A transportation tool comprising:
   a first tower having a first gimbal assembly and a first spindle weldment;
   a second tower having a second gimbal assembly and a second spindle weldment;
   a first side rail and a second side rail securing said first tower to said second tower to support a single composite aircraft fuselage section, said first and second side rails defining vacuum chamber accumulators;
   a drive system secured to the transportation tool at the first tower and configured to rotate the single composite aircraft fuselage section when the single composite aircraft fuselage section is supported by the transportation tool, wherein the drive system controls the 360 degree longitudinal rotation of the single composite aircraft fuselage section in both a clockwise and counterclockwise direction using the first gimbal assembly, the first spindle weldment, the second gimbal assembly, and the second spindle weldment; and
   a brake system secured to the transportation tool and configured to decelerate rotation of the single composite aircraft fuselage section and to keep the single composite aircraft fuselage section stationary when rotation ceases.

2. The tool of claim 1, wherein said first and second side rails maintain vacuum integrity of a payload bagged for processing in an autoclave.

3. The tool of claim 1, further comprising a first set of swivel casters configured for rolling said transportation tool across a surface in any direction, and a second set of casters configured to engage floor-mounted tracks for rolling said transportation tool along the tracks.

4. The tool of claim 1, wherein the first spindle weldment is mounted on the first gimbal assembly and the second spindle weldment is mounted on the second gimbal assembly for coupling the single composite aircraft fuselage section to the first and second towers.

5. The tool of claim 1, wherein the first gimbal assembly is mounted on the first tower and the second gimbal assembly is mounted on the second tower, wherein the first spindle weldment is mounted on the first gimbal assembly and the second spindle weldment is mounted on the second gimbal assembly, the spindle weldments and the gimbal assemblies enabling the single composite aircraft fuselage section to rotate at either end about three mutually perpendicular axes.

6. The tool of claim 5, wherein the first and second gimbal assemblies are each mounted on a moveable column configured to raise and lower the gimbal assemblies.

7. The tool of claim 1, wherein said brake system further comprises pins configured to lock the single composite aircraft fuselage section against rotation.

8. A transportation tool for transporting a single composite aircraft fuselage section comprising:
   a first spindle weldment mounted on a first tower;
   a second spindle weldment mounted on a second tower, the spindle weldments configured to couple the single composite aircraft fuselage section to the first and second towers; a first gimbal assembly mounted on the first tower wherein the first spindle weldment is mounted on the first gimbal assembly, the first spindle weldment and the first gimbal assembly enabling the single composite aircraft fuselage section to rotate at a first end about three mutually perpendicular axes;
   a second gimbal assembly mounted on the second tower wherein the second spindle weldment is mounted on the second gimbal assembly, the second spindle weldment and the second gimbal assembly enabling the single composite aircraft fuselage section to rotate at a second end about three mutually perpendicular axes;
   a drive system secured to the transportation tool and coupled to the first spindle weldment and configured to rotate the single composite aircraft fuselage section when the single composite aircraft fuselage section is mounted in the tool, wherein the drive system controls the 360 degree longitudinal rotation of the single composite aircraft fuselage section in both a clockwise and counterclockwise direction;

a first side rail and a second side rail securing said first tower to said second tower to support the single composite aircraft fuselage section, said first and second side rails defining vacuum chamber accumulators; and a first set of swivel casters configured for rolling said transportation tool across a surface in any direction, and a second set of casters configured to engage floor-mounted tracks for rolling said transportation tool along the tracks.

9. The tool of claim 8, wherein said first and second side rails maintain vacuum integrity of a bagged single composite aircraft fuselage section for processing in an autoclave.

10. The tool of claim 8, wherein the first and second gimbal assemblies are each mounted on a moveable column configured to raise and lower the gimbal assemblies.

11. The tool of claim 8, further comprising a brake system secured to the transportation tool and configured to decelerate rotation of the single composite aircraft fuselage section and hold the single composite aircraft fuselage section stationary when the single composite aircraft fuselage section is mounted in the tool.

12. The tool of claim 11, wherein said brake system further comprises pins that lock the single composite aircraft fuselage section in the stationary position when mounted in the tool.

13. A method for manufacturing a one-piece composite aircraft fuselage section, comprising:

Securing a first tower to a second tower using a first side rail and a second side rail to comprise a support structure;

loading a composite fuselage section into the support structure;

performing vacuum bagging operations on the composite fuselage section, wherein the first side rail and the second side rail define vacuum accumulators;

maintaining vacuum integrity of the bagged composite fuselage section for processing in an autoclave using the vacuum accumulators integrated into the support structure;

rotating the composite fuselage section 360 degrees when the composite fuselage section is supported by the support structure using a drive system secured to the support structure, wherein the rotation is enabled by a first gimbal assembly mounted on a first tower of the support structure and a second gimbal assembly mounted on a second tower of the support structure, and wherein a first spindle weldment is mounted on the first gimbal assembly and a second spindle weldment is mounted on the second gimbal assembly to further aid in the 360 degree rotation of the composite fuselage section by the drive system; and decelerating rotation of the composite fuselage section and keeping the composite fuselage section stationary when rotation ceases using a brake system secured to the support structure.

14. The tool of claim 1, wherein the first and second side rails include valve fittings.

15. The tool of claim 8, wherein the first and second side rails include valve fittings.

16. The tool of claim 1, wherein the drive system and the brake system are actuated by air.

17. The tool of claim 16, wherein when the air is on the drive system rotates the single composite aircraft fuselage section and the brake system is disengaged, and when the air is off the drive system does not rotate the single composite aircraft fuselage section and the brake system is engaged.

18. The tool of claim 3, wherein each of the casters in the second set of casters includes a raised ridge about its circumference for engaging the tracks.

19. The tool of claim 11, wherein the drive system and the brake system are actuated by air.

20. The tool of claim 19, wherein when the air is on the drive system rotates the single composite aircraft fuselage section and the brake system is disengaged, and when the air is off the drive system does not rotate the single composite aircraft fuselage section and the brake system is engaged.

21. The tool of claim 8, wherein each of the casters in the second set of casters includes a raised ridge about its circumference for engaging the tracks.

* * * * *